US008824429B2

(12) United States Patent
Znamova et al.

(10) Patent No.: US 8,824,429 B2
(45) Date of Patent: Sep. 2, 2014

(54) AUTOMATIC ESTIMATION OF NODE LOCATION BASED ON TRACE INFORMATION

(75) Inventors: Dana Znamova, Rockville, MD (US); Patrick J. Malloy, Washington, DC (US); John W. Strohm, Rockville, MD (US)

(73) Assignee: Riverbed Technology, Inc., San Francisco, CA (US)

( * ) Notice: Subject to any disclaimer, the term of this patent is extended or adjusted under 35 U.S.C. 154(b) by 2525 days.

(21) Appl. No.: 11/490,586

(22) Filed: Jul. 21, 2006

(65) Prior Publication Data

US 2007/0041335 A1 Feb. 22, 2007

Related U.S. Application Data (60) Provisional application No. 60/709,776, filed on Aug. 19, 2005.

(51) Int. Cl.
*H04L 12/66* (2006.01)
*H04W 4/00* (2009.01)
*H04L 12/26* (2006.01)
*H04W 16/00* (2009.01)
*H04W 28/00* (2009.01)

(52) U.S. Cl.
CPC ........... *H04L 43/0864* (2013.01); *H04W 16/00* (2013.01); *H04W 28/00* (2013.01)
USPC ............................ 370/338; 370/351; 370/229

(58) Field of Classification Search
CPC ... H04L 43/0864; H04W 16/00; H04W 28/00
USPC ........ 455/456.1–457, 422.1, 404.2, 448, 450, 455/423, 458; 370/241, 252, 253
See application file for complete search history.

(56) References Cited

U.S. PATENT DOCUMENTS

| 5,802,106 A * | 9/1998 | Packer .......................... 375/225 |
| 7,289,454 B2 * | 10/2007 | Bovo et al. ..................... 370/252 |
| 2001/0050903 A1 * | 12/2001 | Vanlint ........................ 370/252 |
| 2002/0094820 A1 * | 7/2002 | Keranen et al. ............... 455/456 |

* cited by examiner

*Primary Examiner* — Nizar Sivji
(74) *Attorney, Agent, or Firm* — Park, Vaughan, Fleming & Dowler LLP (57) ABSTRACT

The locations of nodes in a network are determined relative to the location of monitoring devices that collect trace information on the network. By appropriate sorting, filtering, and characterizing the trace information, nodes are identified as being local to or remote from each monitoring device that detects traffic to or from the node. If the trace information is insufficient to determine the relative location of a node, the node is identified as such. By identifying the nodes whose locations can be determined automatically by this analysis of the trace information, the number of nodes whose locations must be determined by more costly manual methods can be substantially reduced.

32 Claims, 4 Drawing Sheets

AUTOMATIC ESTIMATION OF NODE LOCATION BASED ON TRACE INFORMATION

This application claims the benefit of U.S. Provisional Patent Application 60/709,776, filed Aug. 19, 2005.

BACKGROUND AND SUMMARY OF THE INVENTION

This invention relates to the field of network analysis, and in particular to a technique for determining node location based on limited traffic trace information.

A variety of tools have been developed, and continue to be developed, to facilitate the management of communication networks, and in particular for managing networks that provide communications among computer devices. Many of these tools are configured to model the network's performance under a variety of traffic conditions, both real and hypothesized, and in many cases, base this performance on data collected from the actual network.

Network monitoring devices, commonly referred to as "sniffers" or "protocol analyzers", are often used to capture traffic flow information. Such devices are placed at various points within the network and are configured to monitor the traffic flowing through that point. Generally, these traffic monitoring devices create a record of each message's header information and the time at which the message was detected; if the monitoring device is configured to monitor multiple communication paths at its location, the path information is also stored in the record. The collection of records from one or more monitoring devices is termed 'trace information'. Ideally, a network monitoring device would be placed at each node location in a network, so that the time of occurrence (transmission or reception) of each message is accurately recorded. Often, however, the number of monitoring devices is substantially less than the number of nodes of a network, and the times of occurrence of each message at each node can only be estimated, based on the limited availability of trace information.

This limited trace information is often provided in an environment of limited network configuration information, including the lack of information regarding the location of each node in the network. Often, the network configuration is determined by querying devices at each node for their connectivity information, but such connectivity information generally provides only a logical structure of the network, and not its physical structure. That is, it may be apparent that node A is connected to nodes B, C, and D, and node B is connected to node D but not node C, and so on, but the locations, both relative and absolute, of each of the nodes may be unknown.

The location of each node of a network is often a significant parameter in the modeling of a network, particularly when timing characteristics, such as communication delay, is modeled. Such modeling is often hierarchical in nature, such that different models are used dependent upon whether the nodes are local to, or distant from, each other. If, for example, clusters of nodes, such as nodes in a local area network (LAN), are identified, different models may be used to model within-cluster and between-cluster communications. The between-cluster communication models may include, for example, an estimate of the actual distance between clusters, so that the physical propagation delay (distance divided by speed) may be included in the model. In other models, the mere fact that the nodes are substantially distant from each other is of significance, to determine whether to include delays associated with gaining access to a long-distance or wide area network (WAN).

Figure 1A:
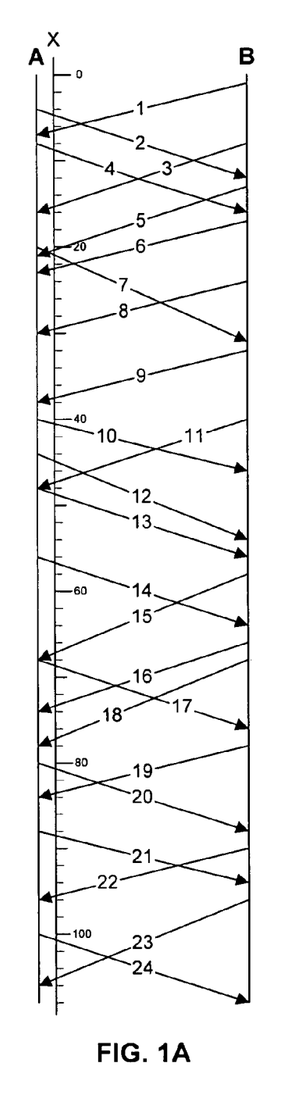
FIGS. 1A-1C illustrate an example of traffic between two nodes that is monitored by alternatively-located monitoring devices.
Figure 1B:
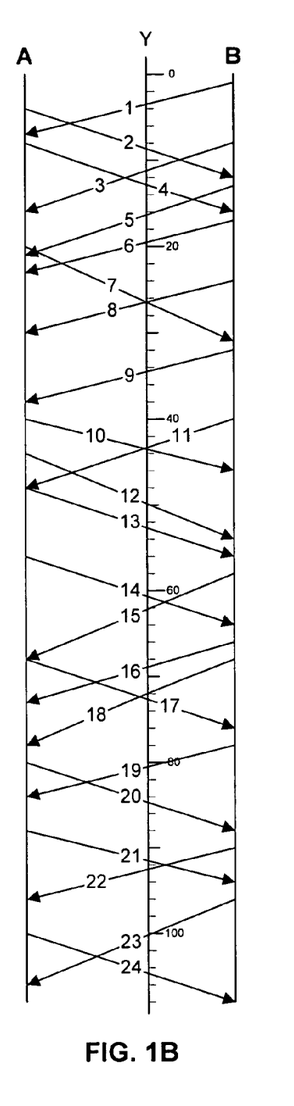
Figure 1C:
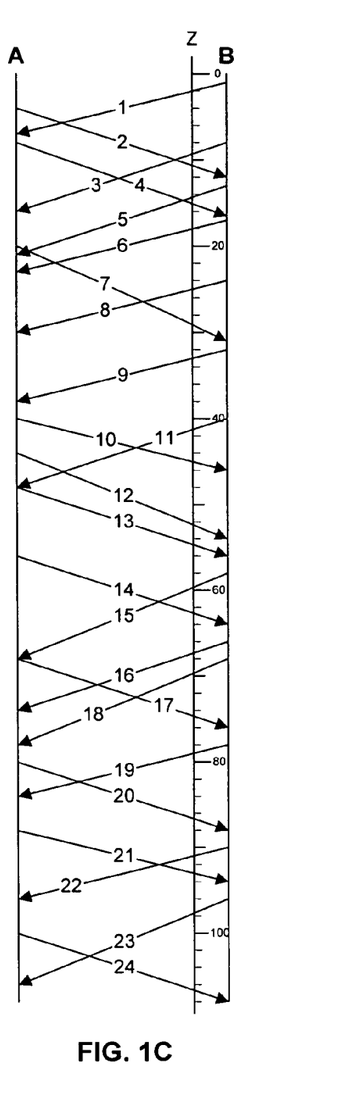

FIGS. 1A-1C illustrate a sequence of messages 1-24 communicated between two nodes, A and B, and three possible configurations of monitoring devices X, Y, Z. In FIG. 1A, the monitoring device X is local to node A and remote from node B; in FIG. 1B, the monitoring device Y is remote from both nodes A and B; and in FIG. 1C, the monitoring device Z is remote from node A, and local to node B. The example of FIG. 1B is provided for completeness; generally, monitoring devices are co-located with a node, either directly connected to the node, or positioned on a LAN that is directly coupled to the node.

Figure 2A:
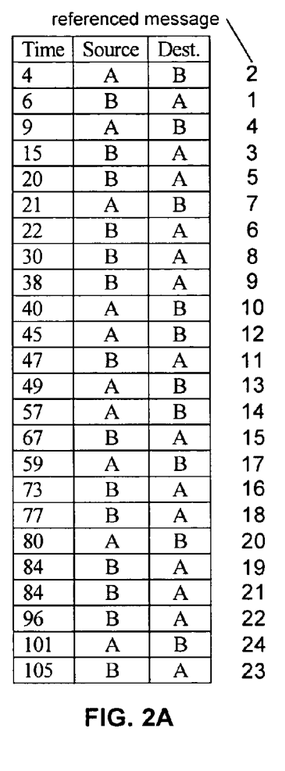
FIGS. 2A-2C illustrate example trace information corresponding to the example traffic of FIGS. 1A-1C.
Figure 2B:
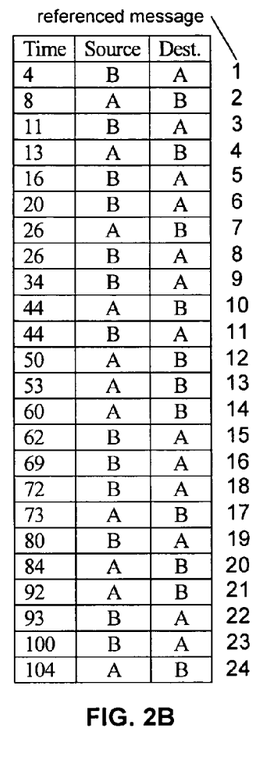
Figure 2C:
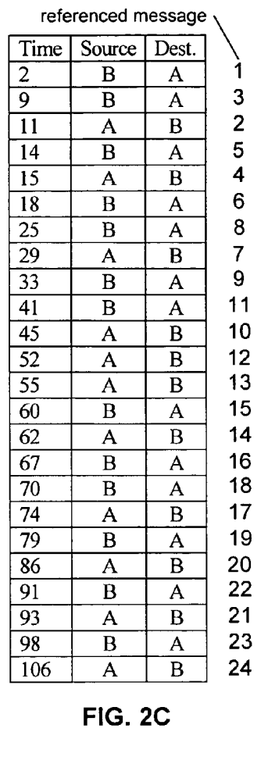

As illustrated by the time-lines associated with the monitors X, Y, and Z, the messages 1-24 will be reported as occurring at different times, dependent upon the location of each of the monitors X, Y, and Z. FIGS. 2A-2C illustrate the corresponding trace information (time of occurrence, source node, and destination node) that would be recorded by each of these monitors. Other information, such as the size of the message and related protocol information will also generally appear in the recorded trace information.

Although the trace information in FIGS. 2A-2C is informative, most analysis tools require the information content of FIGS. 1A-1C; in particular, an analysis tool that addresses communications between nodes A and B would generally require information regarding the actual sequence of the messages 1-24 between the nodes. As can be seen, however, because of the different times of appearance of each message 1-24 at each of the monitors, the actual sequence of the messages 1-24 is not immediately apparent from the trace information of FIGS. 2A-2C. The example of FIG. 2B illustrates the actual time-sequence of the messages 1-24, but without knowing that monitoring device Y is located midway between the nodes A-B, the trace information does not provide a basis for determining that the sequence of FIG. 2B is any more or less reflective of actual time-sequence than the sequences of FIGS. 2A or 2C. That is, without knowing the relative location of the monitoring device used to create the given trace information 2A, 2B, or 2C, it is virtually impossible to create the message-sequence diagram of FIGS. 1A-1C from the given trace information.

Conventionally, the physical location of each monitoring device is known to the network manager, because the network manager will generally have placed the monitoring devices at select locations throughout the network. The physical location of each node on the network, on the other hand, must generally be provided by the users of the network, and obtaining this information from each user can be a time-consuming and often infeasible task.

It is an objective of this invention to facilitate a determination of the location of nodes in a network. It is a further objective of this invention to provide this location determination with minimal a priori information from the users of the network. It is a further objective of this information to reduce the number of users of a network that must be contacted to determine the location of each node in a network.

These objectives, and others, are achieved by a method and system that determines the location of nodes in a network relative to the location of monitoring devices that collect trace information on the network. By appropriate sorting, filtering, and characterizing the trace information, nodes are identified as being local to or remote from each monitoring device that detects traffic to or from the node. If the trace information is insufficient to determine the relative location of a node, the node is identified as such. By identifying the nodes whose locations can be determined automatically by this analysis of the trace information, the number of nodes whose locations must be determined by more costly manual methods can be substantially reduced.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the FIGS., and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

This invention is premised on the observation that, generally, communications between two nodes correspond to a 'dialog'; that is, the messages communicated between the nodes are related/responsive to each other. If related/responsive message pairs can be identified, the "round-trip-time" between the sending of a message and the receipt of the corresponding response can be determined, and an analysis of such round-trip-times can facilitate a determination of the relative locations of each node relative to a monitoring device that detects these messages.

FIGS. 3A-3D illustrate example timing diagrams of traffic between different configurations of remote and local nodes, to facilitate an understanding of the underlying principles of this invention. In each of these FIGS., the arrows between nodes A and B illustrate the propagation of a message between the nodes, the slope of the arrow being indicative of the time required for the message to propagate between the nodes, and may include any number of delays, including network access delay, bandwidth delay, long-distance propagation delay, queuing delays at intermediate switches, and so on, as the message travels between nodes. The connection of the head of an arrow/message to the tail of the next arrow/message at each node indicates that the second message is in response to the first message, the length of the connection being indicative of a response-delay time at the node.

Figure 3A:
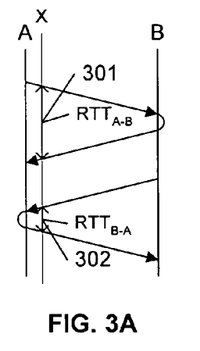
FIGS. 3A-3D illustrate example timing diagrams of traffic between different configurations of remote and local nodes.
Figure 3B:
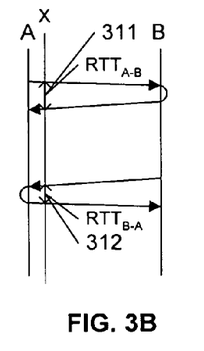

FIGS. 3A and 3B illustrate example timing diagrams of traffic between remote and local nodes, respectively. As illustrated by the slope of the arrows, the propagation delay for a message to travel between remote nodes is substantially longer that the propagation delay for a message to travel between local nodes. In FIG. 3A, the observed round-trip-time for a message-pair originating at node A, $RTT_{A-B}$ 301, is substantially longer than the observed round-trip-time for a message-pair originating at node B, $RTT_{B-A}$ 302, which would indicate that node A is local to the monitoring device X, and that node B is remote from monitor X. Conversely, in FIG. 3B, the observed round-trip-times $RTT_{A-B}$ 311 and $RTT_{B-A}$ 312 are not significantly different, which would indicate that, in this example, monitor X is substantially equidistant from both nodes A and B.

Figure 3C:
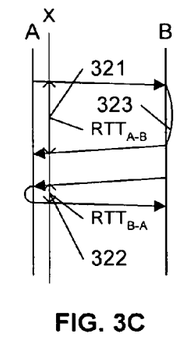

However, as illustrated in FIG. 3C, a simple comparison of round-trip-times 321, 322 is not determinative of the locations of the nodes relative to the monitoring device, because the observed round-trip-time for a message pair includes the response-delay time at the responding node, which could be attributed to a combination of processing delays or protocol delays. In the example of FIG. 3C, the round-trip-times 321, 322 appear similar to the round-trip-times 301, 302 of FIG. 3A, indicating remote nodes, whereas the slope of the message arrows in FIG. 3C appears similar to the slope of the message arrows in FIG. 3B, indicating local nodes. In the example of FIG. 3C, the response-delay time 323 at node B accounts for the extended round-trip-time $RTT_{A-B}$ 321, even though nodes A and B are local to each other, and local to the monitoring device X.

Figure 3D:
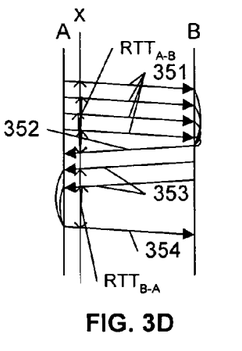

In the context of this invention, local nodes are defined as nodes within a common local-area-network (LAN), and remote nodes are defined as nodes that are not within a common LAN, and require wide-area-network (WAN) communications. In general, remote nodes are characterized as exhibiting a round-trip-delay that is substantially longer than the delay expected due to within-LAN propagation delay. However, merely detecting a longer-than-average-LAN-delay is not necessarily sufficient to determine whether a node is remote or local. FIG. 3D illustrates an example of a message-exchange wherein node B provides a single response 352 to multiple messages 351 from node A, and the round-trip-time will be dependent upon which of the messages 351 from A is used. In like manner, the determination of the round-trip-time from B to A, based on the messages 353 and response 354, is dependent upon which message 353 is used. One of ordinary skill in the art will recognize that this invention is not limited to this LAN/WAN characterization of the local/remote determination. In a campus environment, for example, the campus network may include a plurality of interconnected sub-networks, and the local/remote determination may be based on distinguishing round-trip delays within the campus network from delays incurred going beyond the campus network. In like manner, the local/remote determination may correspond to a continental/overseas determination, an earth/satellite determination, and so on.

These FIGS. 3A-3D of situations that affect the recorded times of occurrences of messages at a trace location X are provided as examples to demonstrate that the recorded times are not, per se, deterministic of whether a node is local or remote from the location at which the times were recorded. However, recognizing that there are dependencies and/or correlations between these times of messages at the trace location and the relative locations of the nodes that provide the messages, this invention provides a technique that has been demonstrated to be particularly well suited for the location determinations, based on these dependencies.

Figure 4A:
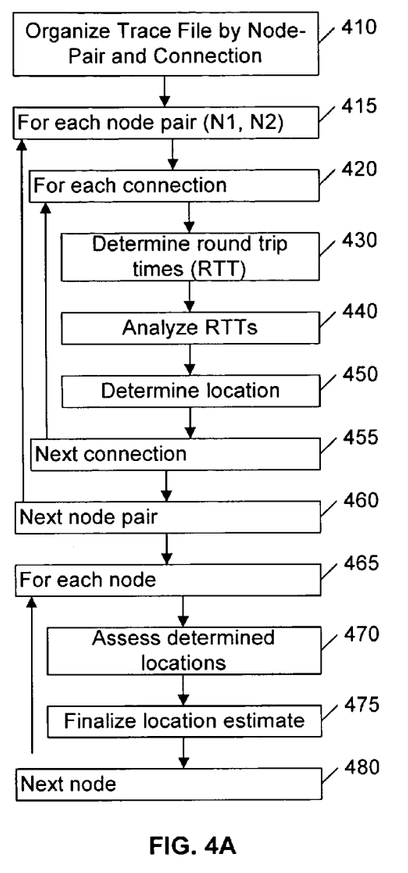
FIGS. 4A-4D illustrate example flow diagrams for determining the relative location of nodes in a network based on trace information in accordance with this invention.
Figure 4B:
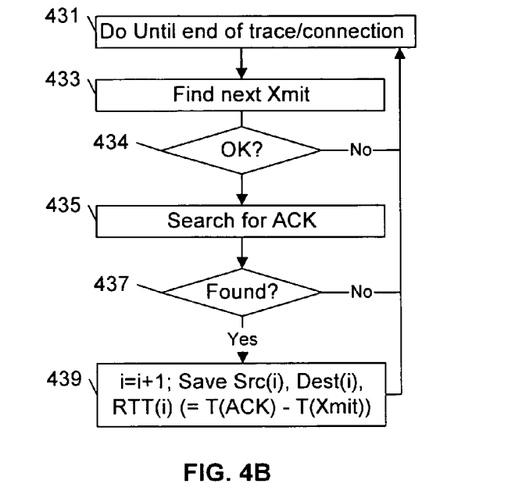
Figure 4C:
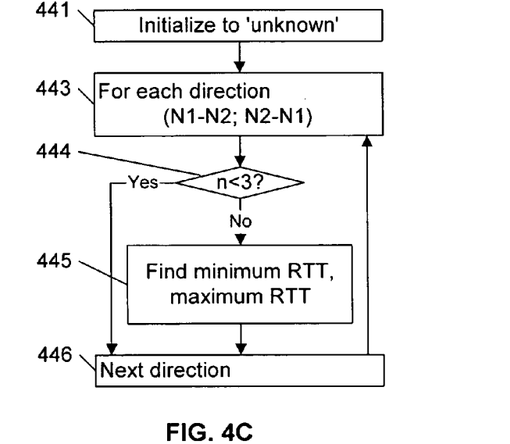
Figure 4D:
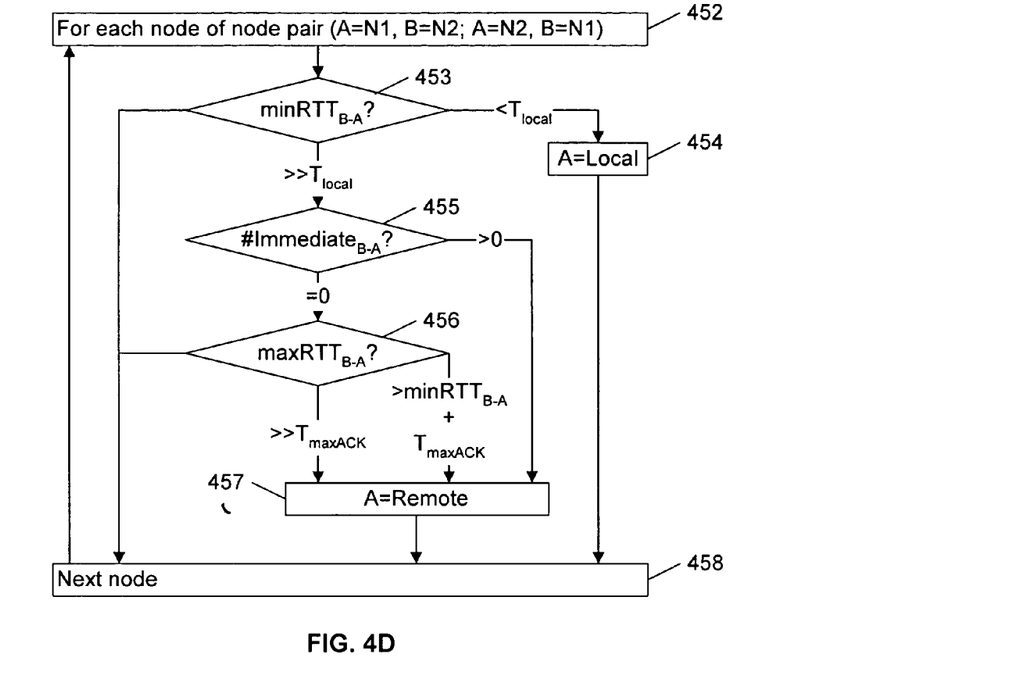

FIGS. 4A-4D illustrate example flow diagrams for determining the relative location of nodes in a network based on trace information. FIG. 4A illustrates the overall flow, and FIGS. 4B-4D illustrate the details of particular processes of FIG. 4A. The invention is presented using the paradigm of TCP communications, although one of ordinary skill in the art will recognize that the principles presented herein can be applied to other protocols as well.

At 410, the trace information is optionally sorted/filtered to facilitate the processing of information for each pair of nodes monitored by the trace device, and for each connection established by each pair of nodes. The loop 415-460 processes the information from each node-pair, and the loop 420-455 processes the information for each connection.

At 430, the round-trip-times are determined. In accordance with one aspect of this invention, round trips are determined by finding messages with associated "acknowledgment" responses. Conventionally, an acknowledgment is provided with minimal processing and/or analysis on the part of the receiving node, and therefore unlikely to contain a substantial amount of processing delay at the node. In TCP, a sequence number is associated with each byte of each application message; each TCP message header includes the sequence number of the first application byte in the message, and the length of each message determines the sequence number of the first byte of each succeeding message. The receiving node acknowledges the receipt of one or more messages by notifying the transmitting node of the next sequence number that it expects to receive. That is, receipt of an acknowledgement sequence number of M indicates to the transmitter that the receiver has received each of the M-1 transmitted bytes.

FIG. 4B illustrates the processing associated with determining round-trip delays. The loop 431-439 is executed until the entire trace is processed, or, if the processing is organized by connections, as illustrated in FIG. 4A, the loop 431-439 is executed until the entire connection is processed. The process searches forward (from oldest time to newest time) 433 until a candidate transmission is found 434. The test at 434 skips transmissions for which no acknowledgements are expected, and transmissions for which an acknowledgement may be suspect, such as a retransmission. One of ordinary skill in the art will recognize that other tests may be applied, in lieu of, or in addition to, these example tests. For example, the trace record will generally include the size of the message, and the test at 434 may select only relatively short messages, to minimize the inclusion of size-dependent delays in the determination of the round-trip times.

At 435, the process searches forward for an acknowledgement of this message. As noted above, an acknowledgement may acknowledge more than one message, as illustrated in FIG. 3D. Such an acknowledgement will be a delayed acknowledgement to all but the last message being acknowledged, and a round-trip time based on a delayed acknowledgement will be known to include this delay at the receiving node. In TCP, a delayed acknowledgement is recognized as an acknowledgement that contains an acknowledgement sequence number that is larger than the transmitted message's sequence number plus its size. In this manner, because the acknowledgement sequence number will only correspond to the last message's sequence number plus its size, the acknowledgement of each of the multiple messages, except the last message, will be recognized as a delayed acknowledgement. At 437, acknowledgements that correspond to delayed acknowledgements to the current transmission are recognized and ignored, by causing the 'found' test to fail.

If a delayed acknowledgement is found, or if no acknowledgement is found for the message in the trace file, or in the subset for the connection, at 437, a round-trip-time cannot be determined, and the process loops back to 431 to seek the next candidate transmission.

If, at 437, the acknowledged message is found, the identification of the source and destination of the message and the round trip time, computed as the difference between the times that the acknowledgement and the message were detected by the trace device, is stored, at 439. Optionally, a characterization of the acknowledgement and/or message may also be stored, to facilitate subsequent processing. For example, an acknowledgement may be transmitted as part of a data transmission originating at the receiving node, and thus the round-trip time may include a latency caused by the creation and transmission of the data message. However, the acknowledgement of some messages, such as the TCP SYN message that identifies the start of a transaction is sent 'immediately' per TCP specifications. The TCP SYN message is also useful to detect 'spoofing', wherein as discussed further below. Additionally, the TCP SYN message does not contain data, and therefore will not generally incur a substantial processing delay at the receiving node. The observed round trip times for such messages can be considered to be a more reliable estimate of a true 'immediate' response, and are preferably marked as such, for receiving preferential 'weight' for the subsequent location-determination process. In like manner, if it is known that the nodes are configured to send an acknowledgement for at most two received messages, as is typical, the round-trip time of a multiple-message-acknowledgement relative to the second message can also be considered to be indicative of an 'immediate' response, and marked as such. Conversely, the acknowledgement to a large message will not typically be sent until the entire message is received, and therefore the time required to receive each of the bits of the message will affect the time that the acknowledgement is sent and received by the tracer device. In like manner, the retransmission of a message implies that a problem existed at some point in the transmission process, and the observed round trip times for the original and retransmitted messages can be considered to be less reliable than others, and should be ignored, or at least given substantially less weight, during the location-determination process. After storing the round-trip-time and other pertinent information, the process loops back to 431 to seek the acknowledgement for the next data segment, until the entire trace, or the trace of the connection, is processed, and control returns to step 430 in FIG. 4A.

The loop 430-455 is configured to process each node-pair individually. Other processing-orders may alternatively be used, such as processing each node individually, but the processing by node-pair has been found to be efficient.

At 440, the determined round-trip times are analyzed to characterize the round-trip times associated with each node-pair, as detailed in FIG. 4C. In the example embodiment, each node-pair is characterized by a minimum and a maximum round-trip time. Other characterizing statistics, such as mean, median, mode, variance, etc. may also or alternatively be used, depending upon the assumed transmission-effects model, but the minimum and maximum round-trip times have been found to be particularly well suited for determining the relative location of nodes in a TCP-based network.

By default, the characterization of the round-trip times associated with each node-pair is set to 'unknown', at 441 in FIG. 4C. The loop 443-446 is executed for each direction (i.e. from node N1 to node N2, and from node N2 to node N1). To assure a level of reliability, a minimum number of round-trips in each direction is optionally required to characterize the round-trip times, at 444. In this example embodiment, the observed round-trip times for a connection are disqualified if fewer than three round-trip times are available, although any criteria may be used, depending upon the desired level of estimation reliability. Other tests for reliability may be applied as well. For example, evidence of 'spoofing', wherein an intermediary node intercepts and acknowledges data received from the sender, then forwards the data to the intended destination, can be used to 'disqualify' the observed round-trip times for the connection, because these times will generally correspond to the round-trip time between the sender and the spoofing intermediary, independent of the location of the destination node. In a preferred embodiment, because spoofing is not generally initiated until after the source-destination connection is established in response to a TCP SYN message, a long round-trip-time for a TCP SYN message, followed by much shorter round-trip times for subsequent messages is used to identify spoofing. The disqualification can take any of a variety of forms, including, for example, ignoring all of the observed round-trip times and thereby ignoring the entire connection, or merely ignoring all of the observed round-trip times that are less than the round-trip time of the TCP SYN message. At 445, the characterizing parameters for the qualified measurements are determined; as noted above, in this example, the minimum and maximum round-trip time is used to characterize communications in each direction for each node-pair. After all detected node-pairs are processed, control returns to 450 in FIG. 4A.

The determination of location at 450 is detailed in FIG. 4D. In this example determination, two time parameters are considered of interest. $T_{local}$ is a maximum time within which a local node should be expected to respond. In an example embodiment, a local time of 5 ms is generally considered as a sufficient time for a node to receive an acknowledgement of a message on a LAN, although other time thresholds may be used. The other time parameter of interest is the maximum allowable delay between the receipt of a message and generating an acknowledgement of that message, $T_{maxACK}$. As noted above, nodes may delay an acknowledgement of a message, in anticipation of another message from the same source that can be acknowledged with the current message by a multiple-message acknowledgement, thereby reducing the amount of 'overhead' traffic required for message acknowledgement. In many/most protocols, a maximum time limit is specified, so that the transmitting node can decide to initiate a retransmission when an acknowledgement is not received. Other time parameters may be defined, as well, as will be evident from the example embodiment.

In FIG. 4D, the location of each node of a current node-pair is determined via the loop 452-458. In this example embodiment, two time parameters are considered significant to the determination of location, although other time parameters may be used, as well. The first time parameter is "$T_{local}$", which is defined as time that is so short that it precludes the possibility that the message experienced delays that are characteristic of WAN communication. Some messages may take longer than this time to propagate to and from a local node, but a remote node is not expected to be able to respond to a message within this time limit. The other time parameter is "$T_{maxACK}$", which is defined as a maximum time that a node is permitted between the receipt of a message and the transmission of an acknowledgement. Generally, this time is set by the protocol within which the node is operating. For example, in certain TCP implementations, a node must respond to a message within 200 ms of receipt of the message; if a node is configured to send an acknowledgement with every other message, it must respond to the first message within 200 ms, regardless of whether a second message is received.

Using the term "A" for the node whose location is being determined, and "B" for the other node of the pair, the determined minimum round-trip-time of a message from B to A ($minRTT_{B-A}$) is tested, at 453. If, at any time, node A responds within a time that is less than $T_{local}$, then node A must be local to the trace device, by definition of the term $T_{local}$, and is identified as such, at 454. If, on the other hand, the shortest time within which node A responded to a message is substantially greater than $T_{local}$, node A is likely to be remote from the trace device, but not conclusively, and further tests 455 are performed. The term 'substantially greater' is subjective, but is generally defined as a time that would generally indicate that the node is not likely to be local, such as twice as great as $T_{local}$, or some other factor of $T_{local}$, depending on the degree of confidence required to lead to this conclusion. If, at 453, the minimum round-trip-time for a message from B to A ($minRTT_{B-A}$) is somewhere between $T_{local}$ and substantially-greater-than-$T_{local}$, a location determination is not made, and the next node is tested.

At 455, if the minimum round-trip-time for a message from B to A ($minRTT_{B-A}$) is substantially greater than $T_{local}$, and it is known that at least one acknowledgement was an immediate acknowledgement, such as an acknowledgement to a TCP SYN message or other known immediate response, as discussed above, then it is reasonable to conclude that A is remote, and it is identified as such, at 457.

The decision block at 456 is reached when the minimum round-trip-time for a message from B to A ($minRTT_{B-A}$) is substantially greater than $T_{local}$, but none of the acknowledgements are known to be immediate, and therefore it is not known whether the long response time from node A is due to node A being remote from the trace device, or due to node A having a slow response time to received messages or having only delayed acknowledgements. That is, the minimum round trip time suggests that node A is not local, but without having a known immediate acknowledgment, the minimum round trip time is a somewhat arbitrary measure, and further testing is warranted. In the example embodiment of FIG. 4D, the maximum round trip time for a message from B to A ($maxRTT_{B-A}$) is tested. If the maximum round trip time is substantially greater than the maximum time that a node can be expected to acknowledge a message $T_{maxACK}$, then the combination of factors (minimum round trip time substantially greater than $T_{local}$, and at least one round trip time that is substantially greater than a specified maximum acknowledgement time) leads to the conclusion that node A is remote from the trace device, and it is identified as such, at 457.

If the variance among round trip times is greater than the specified maximum acknowledgement time $T_{maxACK}$, in combination with the fact that the minimum round trip time substantially greater than $T_{local}$, it is likely that this variance is caused by varying delays incurred while accessing the non-local network. Therefore, at 456, if the maximum round trip time for a message from B to A ($maxRTT_{B-A}$) is greater than the sum of the minimum round trip time ($minRTT_{B-A}$) and the specified maximum acknowledgement time $T_{maxACK}$, node A is determined to be remote, and it is identified as such, at 457.

If the tests at 453, 455, and 456 do not satisfy the above detailed criteria, a determination of node A's location is not made, and the next node is processed. After both nodes are processed, control returns to block 455 in FIG. 4A.

As noted above, the aforementioned processing by node pair and by connection allows the trace data to be processed efficiently. However, such a segmented analysis can lead to conflicting results. The loop 465-480 is configured to identify and resolve such conflicts. Within the loop 430-455, the node determination is recorded for each node of each node pair of each connection. As such, each of these determinations form a tentative location determination, and the loop 465-480 is configured to process each node to assess the tentative locations determined for that node within each of the node pairs that include the node to determine a final location estimate for the node.

At 470, the tentative location determinations are compared. Undetermined locations (i.e lack of a definitive local/remote determination in FIG. 4D) are ignored, and if all of the other tentative local/remote determinations are consistent, the location is finalized as such. If some tentative determinations are local, and some remote, resolution of the conflict is dependent upon the criteria used for these tentative determinations. As noted above with regard to FIG. 4D, the determination that a node is remote is somewhat less than definitive and often requires multiple tests, whereas the determination that a node is local is generally conclusive. If, for example the $T_{local}$ criteria is truly a response time that a remote node could not achieve, then a single determination of the node being local based on this $T_{local}$ parameter is definitive, and will overcome any determination that the node is remote based on long round-trip delays that may have occurred at the local node during other exchanges at the node. If, on the other hand, the $T_{local}$ criteria is a less conservative response time that a remote node might have achieved, albeit unlikely, then a determination that the node is local may not be absolute. In such cases, a composite measure, such as an average, weighted average, and so on, may be used to select one or the other, or to determine that the tentative location determinations are so disparate and inconclusive that node's location is set to 'undetermined'.

Figure 5:
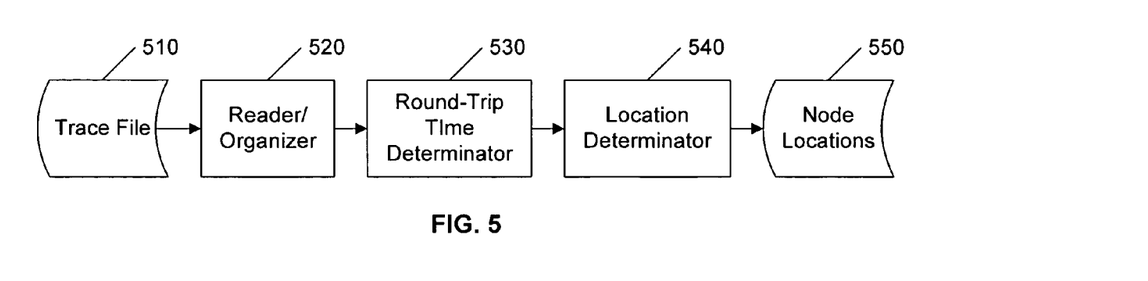
FIG. 5 illustrates an example system for estimating node locations based on trace information in accordance with this invention.

FIG. 5 illustrates an example system that embodies this invention. A reader 520 reads a trace file, and optionally organizes the trace records by node pairs and/or connections. A round-trip time determinator 530 analyzes the trace records to identify pairs of messages, typically a message and its corresponding acknowledgement message, to determine the round-trip time of each message pair, and to characterize the round-trip times for communications between node pairs, or in the more general sense, communications to and from each node. Based on these characterized round-trip times, a location determinator 540 determines the locations 550 of each node, at least to a local/remote/undetermined state. If multiple location determinations are made for each node, the location determinator 540 includes algorithms and/or rules for resolving any conflicting determination.

The foregoing merely illustrates the principles of the invention. It will thus be appreciated that those skilled in the art will be able to devise various arrangements which, although not explicitly described or shown herein, embody the principles of the invention and are thus within its spirit and scope. For example, additional and/or alternative rules may be used as the situation warrants. If, for example, it is known that the trace device is local to at least one node of each node pair, as is common in a typical deployment of trace devices, a determination that both nodes in a node pair are remote can be identified as impossible, and the location of both nodes can be set to 'undetermined'. Also, although the processing of the trace records is presented in the context of node pairs (A, B), for efficiency, one of ordinary skill in the art will recognize that the aforementioned round-trip times $minRTT_{B-A}$ and $maxRTT_{B-A}$ could alternatively be cast as the minimum and maximum round-trip times to and from a node, regardless of the source of the message. That is, the minimum and maximum times from any node to and from node A, $minRTT_{any-A}$ and $maxRTT_{any-A}$ can be used to determine a location of node A, thereby avoiding the need to assess multiple location determinations for each node. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements, and can include an immeasurable number of elements.

We claim:

1. A method comprising:
   obtaining, at a network analysis device, trace records from a trace device, each trace record identifying a message detected by the trace device and including an identification of a source node, a destination node, and a time at which the message was detected at the trace device, the trace device being at an unknown location relative to the source and destination nodes,
   determining, by the network analysis device, a plurality of round-trip times associated with pairs of messages to and from a node of a pair of source-destination nodes, based on the time at which each message was detected by the trace device,
   characterizing, by the network analysis device, the plurality of round-trip times to provide one or more statistics related to the round-trip times to and from the node, and
   determining, by the network analysis device, a location of the node relative to the trace device based on the one or more statistics;
   wherein:
   the pairs of messages to and from the node correspond to messages from and to each of one or more other nodes that each form a node pair with the node,
   the one or more statistics correspond to each node pair, and
   determining the location includes
      determining one or more tentative locations based on the one or more statistics associated with each node pair, and
      determining the location based on an assessment of each of the one or more tentative locations.

2. The method of claim 1, wherein determining each round-trip time includes:
   identifying an acknowledgement message,
   determining a prior message corresponding to the acknowledgement message, and determining the round-trip time based on the times at which the acknowledgement message and the prior message were detected at the trace device.

3. The method of claim 2, wherein determining each round-trip time includes identifying an occurrence of an immediate response, and determining the location is based at least in part on the occurrence of the immediate response.

4. The method of claim 3, wherein the one or more statistics include a minimum round-trip time, and determining the location is based at least in part on whether the minimum round-trip time is less than a time associated with local communications.

5. The method of claim 4, wherein the one or more statistics include a maximum round-trip time, and determining the location is based at least in part on whether the maximum round-trip time exceeds the time associated with remote communications.

6. The method of claim 1, wherein determining each round-trip time includes:
identifying an acknowledgement message,
determining a prior message corresponding to the acknowledgement message, and
determining the round-trip time based on the times at which the acknowledgement message and the prior message were detected at the trace device.

7. The method of claim 6, wherein determining each round-trip time includes identifying an occurrence of an immediate response, and determining the location is based at least in part on the occurrence of the immediate response.

8. The method of claim 7, wherein the one or more statistics include a minimum round-trip time, and determining the location is based at least in part on whether the minimum round-trip time is less than a time associated with local communications.

9. The method of claim 8, wherein the one or more statistics include a maximum round-trip time, and determining the location is based at least in part on whether the maximum round-trip time exceeds the time associated with remote communications.

10. The method of claim 1, wherein determining each round-trip time includes identifying an occurrence of an immediate response, and determining the location is based at least in part on the occurrence of the immediate response.

11. The method of claim 10, wherein the one or more statistics include a minimum round-trip time, and determining the location is based at least in part on whether the minimum round-trip time is less than a time associated with local communications.

12. The method of claim 11, wherein the one or more statistics include a maximum round-trip time, and determining the location is based at least in part on whether the maximum round-trip time exceeds a time associated with remote communications.

13. The method of claim 1, wherein the one or more statistics include a minimum round-trip time, and determining the location is based at least in part on whether the minimum round-trip time is less than a time associated with local communications.

14. The method of claim 13, wherein the one or more statistics include a maximum round-trip time, and determining the location is based at least in part on whether the maximum round-trip time exceeds the time associated with remote communications.

15. The method of claim 1, wherein the one or more statistics include a maximum round-trip time, and determining the location is based at least in part on whether the maximum round-trip time exceeds a time associated with remote communications.

16. The method of claim 1, wherein characterizing the plurality of round-trip times includes determining a reliability associated with the plurality of round-trip times.

17. The method of claim 16, wherein determining the reliability includes detecting evidence of spoofing.

18. The method of claim 17, wherein the evidence of spoofing is based at least in part on a round-trip time associated with a TCP SYN message.

19. A system comprising:
a trace device that is configured to record occurrences of messages between nodes of a network, each trace record identifying a message detected by the trace device and including an identification of a source node, a destination node, and a time at which the message was detected at the trace device, the trace device being at an unknown location relative to the source and destination nodes,
a processing system that is configured to:
determine a plurality of round-trip times associated with pairs of messages to and from a node of the plurality of nodes, based on the time at which each message was detected by the trace device,
characterize the plurality of round-trip times to provide one or more statistics related to the round-trip times to and from the node, and
determine a location of the node relative to the trace device based on the one or more statistics;
wherein:
the pairs of messages to and from the node correspond to messages from and to each of one or more other nodes that each form a node pair with the node,
the one or more statistics correspond to each node pair, and
the processing system is configured to determine the location by:
determining one or more tentative locations based on the one or more statistics associated with each node pair, and
determining the location based on an assessment of each of the one or more tentative locations.

20. The system of claim 19, wherein the processing system is configured to determine each round-trip time by:
identifying an acknowledgement message,
determining a prior message corresponding to the acknowledgement message, and
determining the round-trip time based on the times at which the acknowledgement message and the prior message were detected at the trace device.

21. The system of claim 19, wherein the processing system is configured to:
determine each round-trip time by identifying an occurrence of an immediate response, and
determine the location based at least in part on the occurrence of the immediate response.

22. The system of claim 19, wherein the one or more statistics include a minimum round-trip time, and the processing system is configured to determine the location based at least in part on whether the minimum round-trip time is less than a time associated with local communications.

23. The system of claim 22, wherein the one or more statistics include a maximum round-trip time, and the processing system is configured to determine the location based at least in part on whether the maximum round-trip time exceeds the time associated with remote communications.

24. The system of claim 19, wherein the one or more statistics include a maximum round-trip time, and the processing system is configured to determine the location based at least in part on whether the maximum round-trip time exceeds a time associated with remote communications.

25. The system of claim 19, wherein the processing system is configured to:
   determine a reliability associated with the plurality of round-trip times based at least in part on a round-trip time associated with a TCP SYN message, and
   disqualify some or all of the plurality of round-trip times for providing the one or more statistics, based on the reliability.

26. A computer program stored on a non-transitory computer-readable storage medium, that, when executed on a processing system, causes the processing system to:
   receive a record occurrences of messages between nodes of a network from a trace device, each trace record identifying a message detected by the trace device and including an identification of a source node, a destination node, and a time at which the message was detected at the trace device, the trace device being at an unknown location relative to the source and destination nodes,
   determine a plurality of round-trip times associated with pairs of messages to and from a node of the plurality of nodes, based on the time at which each message was detected by the trace device,
   characterize the plurality of round-trip times to provide one or more statistics related to the round-trip times to and from the node, and
   determine a location of the node relative to the trace device based on the one or more statistics:
   wherein:
   the pairs of messages to and from the node correspond to messages from and to each of one or more other nodes that each form a node pair with the node,
   the one or more statistics correspond to each node pair, and
   to determine the location, the computer program causes the processing system to:
      determine one or more tentative locations based on the one or more statistics associated with each node pair, and
      determine the location based on an assessment of each of the one or more tentative locations.

27. The computer program of claim 26, wherein to determine each round-trip time, the computer program causes the processing system to:
   identify an acknowledgement message,
   determine a prior message corresponding to the acknowledgement message, and
   determine the round-trip time based on the times at which the acknowledgement message and the prior message were detected at the trace device.

28. The computer program of claim 26, wherein the computer program causes the processing system to identify an occurrence of an immediate response to determine each round-trip time, and to determine the location based at least in part on the occurrence of the immediate response.

29. The computer program of claim 26, wherein the one or more statistics include a minimum round-trip time, and the computer program causes the processing system to determine the location based at least in part on whether the minimum round-trip time is less than a time associated with local communications.

30. The computer program of claim 29, wherein the one or more statistics include a maximum round-trip time, and the computer program causes the processing system to determine the location based at least in part on whether the maximum round-trip time exceeds the time associated with remote communications.

31. The computer program of claim 26, wherein the one or more statistics include a maximum round-trip time, and the computer program causes the processing system to determine the location based at least in part on whether the maximum round-trip time exceeds the time associated with remote communications.

32. The computer program of claim 26, wherein the computer program causes the processing system to:
   determine a reliability associated with the plurality of round-trip times based at least in part on a round-trip time associated with a TCP SYN message, and
   disqualify some or all of the plurality of round-trip times for providing the one or more statistics, based on the reliability.

* * * * *